US008825578B2

(12) United States Patent
Lay et al.

(10) Patent No.: US 8,825,578 B2
(45) Date of Patent: Sep. 2, 2014

(54) SYSTEM AND METHOD FOR DETERMINING AN ENTITY'S IDENTITY AND ASSESSING RISKS RELATED THERETO

(75) Inventors: William Michael Lay, Glenwood, MD (US); Yin Wu, Silver Spring, MD (US); Fan-Tao Pu, Potomac, MD (US); Alain Kouvaté, Silver Spring, MD (US)

(73) Assignee: Infozen, Inc., Bethesda, MD (US)

( * ) Notice: Subject to any disclaimer, the term of this patent is extended or adjusted under 35 U.S.C. 154(b) by 506 days.

(21) Appl. No.: 12/901,744

(22) Filed: Oct. 11, 2010

(65) Prior Publication Data
US 2011/0119218 A1 May 19, 2011

Related U.S. Application Data

(63) Continuation-in-part of application No. 12/694,243, filed on Jan. 26, 2010, now Pat. No. 8,548,934.

(60) Provisional application No. 61/261,873, filed on Nov. 17, 2009, provisional application No. 61/307,844, filed on Feb. 21, 2010.

(51) Int. Cl.
*G06F 21/57* (2013.01)
*G06F 21/32* (2013.01)
*G06N 5/02* (2006.01)

(52) U.S. Cl.
CPC ............... *G06F 21/577* (2013.01); *G06N 5/02* (2013.01); *G06F 21/32* (2013.01)
USPC .............................. 706/46; 705/7.28; 705/38

(58) Field of Classification Search
None
See application file for complete search history.

(56) References Cited

U.S. PATENT DOCUMENTS

| 7,499,888 B1* | 3/2009 | Tu et al. ...................... 705/44 |
| 2003/0074317 A1* | 4/2003 | Hofi .............................. 705/44 |
| 2006/0074986 A1* | 4/2006 | Mallalieu et al. .......... 707/104.1 |
| 2006/0095369 A1* | 5/2006 | Hofi .............................. 705/39 |
| 2008/0249793 A1* | 10/2008 | Angell et al. .................. 705/1 |
| 2010/0142764 A1* | 6/2010 | Ikegami ...................... 382/115 |

* cited by examiner

*Primary Examiner* — Stanley K Hill
(74) *Attorney, Agent, or Firm* — McNeely, Hare & War LLP; Kevin J. McNeely, Esq.

(57) ABSTRACT

The invention describes systems and methods of determining an entity's identity and assessing risk related to the entity's identity using a computer. A computer-based system including a tracking module, an information module, a risk assessment module, and a memory is provided. The tracking module records encounters of the entity with the computer-based system. The information module gathers and detects changes in biographic information and biometric information relating to the entity's identity. The risk assessment module evaluates risks associated with the entity. The memory stores the information.

14 Claims, 7 Drawing Sheets

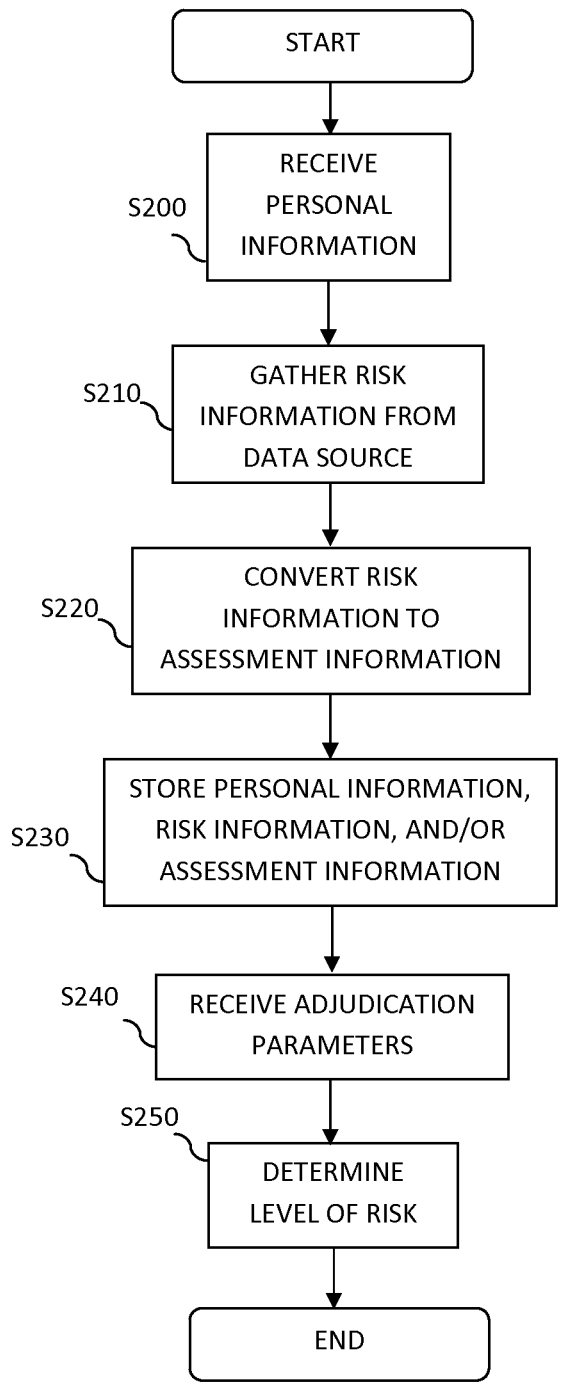

SYSTEM AND METHOD FOR DETERMINING AN ENTITY'S IDENTITY AND ASSESSING RISKS RELATED THERETO

CROSS REFERENCE TO RELATED APPLICATIONS

This utility patent application is a continuation-in-part of U.S. non-provisional patent application Ser. No. 12/694,243 filed on Jan. 26, 2010, now U.S. Pat. No. 8,548,934 and claims priority to U.S. provisional application Ser. No. 61/261,873 filed on Nov. 17, 2009, and U.S. provisional application Ser. No. 61/307,844 filed on Feb. 21, 2010, which applications are incorporated by reference herein in their entirety.

TECHNICAL FIELD

The present disclosure relates to a system and method for assessing risk.

BACKGROUND OF THE INVENTION

Current security threat assessment and fraud detection programs are moving towards a risk-based approach to ensure that entitlement programs, infrastructures, data, and systems are protected from improper use or criminal activity. This risk-based approach requires a significant amount of automation of the threat assessment and fraud detection process and a solid quality assurance process that tracks the quality of a risk assessment process.

However, current risk assessment processes present several major challenges. Unstructured data sources used in the assessment process are hard to convert into a format suitable for an automated assessment. Additionally, non-standard data vocabulary and complicated data semantics are difficult to use by traditional systems such as rule-based engines. Given these challenges, much of the risk assessment processes are manually operated, accuracy rates are less than optimal, and therefore the likelihood of fraud, criminal activity, and other types of risk, increase.

Security threat assessment and fraud detection programs are also moving towards a person-centric approach. This person-centric approach provides an integrated and consolidated view of information about an individual or an organization. This type of approach to risk assessment is meant to increase the quality, accuracy, and security of data. Sophisticated techniques must be put in place in order to provide identity matching functionality in order to assess risks associated with an identity and to detect potential fraud. However, current industry standards lack the ability to automatically process a large number of identity matching events and derive meaningful and actionable information about potential identity fraud issues.

SUMMARY OF THE INVENTION

Embodiments of the present disclosure provide an automated and accurate entity identification and risk assessment process. Additional features and utilities are set forth and/or are obvious from the description provided below.

One or more embodiments of the present disclosure are related to a system or a method of determining an entity's identity and assessing risks related to the entity's identity. According to one aspect, a computer-based system of determining an entity's identity and assessing risks related to the entity's identity includes a tracking module to record encounters of the entity with the computer-based system and to generate encounter information relating to the recorded encounters, an information module to gather biographic information and biometric information relating to the entity's identity and to detect changes in the biographic information and the biometric information based on previously recorded encounters, a risk assessment module to evaluate risks associated with the entity according to the previously recorded encounters and assessment parameters, and a memory to store the biographic information and the biometric information, the detected changes in the biographic information and the biometric information, and the encounter information.

According to another aspect, a method of determining an entity's identity and assessing risks related to the entity's identity using a computer including gathering biographic information and biometric information relating to the entity's identity during a first encounter, recording encounter information regarding the first encounter, detecting changes in the biographic information and the biometric information by comparing the biographic information and the biometric information from the first encounter with second biographic information and biometric information from a second encounter, determining risks associated with the entity according to the encounter information and assessment parameters, and storing the first biographic information and biometric information, the encounter information, and the second biographic information and the biometric information in a memory on the computer.

According to another aspect, a computer-readable recording medium containing computer-readable codes provides commands for computers to execute a process including gathering biographic information and biometric information relating to an entity's identity during a first encounter, recording encounter information regarding the first encounter, detecting changes in the biographic information and the biometric information from the first encounter with second biographic information and biometric information from a second encounter, determining risks associated with the entity according to the encounter information and assessment parameters, and determining the identity of the entity according to the first and second biographic information and the biometric information, the encounter information, and the determined risks associated with the entity.

BRIEF DESCRIPTION OF THE DRAWINGS

The drawings are meant to illustrate the principles of the invention and are not therefore to be considered to limit its scope. The above-mentioned features and objects of the present disclosure will become more apparent with reference to the following description taken in conjunction with the accompanying drawings wherein like reference numerals denote like elements in which:

FIG. 2 is a flow chart illustrating a method of assessing risk according to one or more embodiments of the present disclosure.

DETAILED DESCRIPTION OF THE INVENTION

Figure 1:
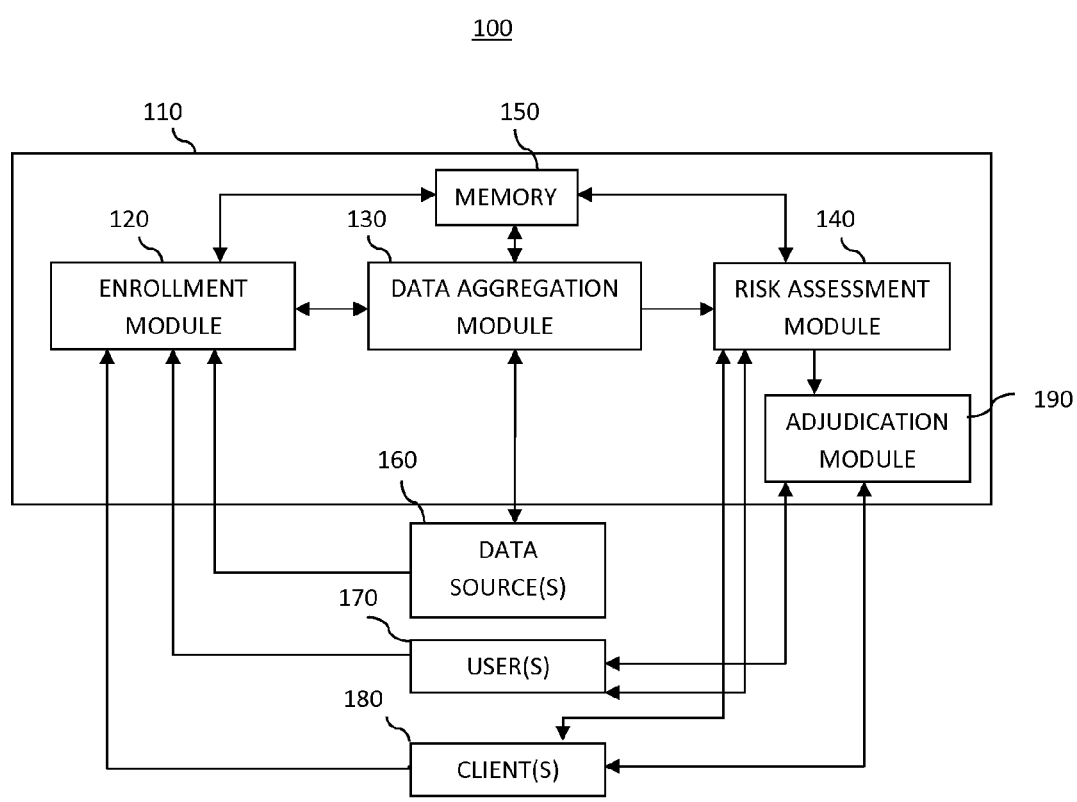
FIG. 1 is a block diagram illustrating a computer system to assess risk according to one or more embodiments of the present disclosure.

Reference will not be made in detail to the exemplary embodiments of the present disclosure, examples of which are illustrated in the accompanying drawings, wherein like reference numerals refer to like elements throughout. The embodiments are described below so as to explain the present disclosure by referring to the figures. Repetitive description with respect to like elements of different exemplary embodiments may be omitted for the convenience of clarity.

Embodiments of the present disclosure provide an automated accurate risk assessment process. The present disclosure addresses major challenges regarding risk assessment, such as: unstructured data sources which are hard to convert into a format conducive to an automated assessment; non-standard data vocabulary and complicated data semantics which make the interpretations of the data by computer systems difficult; and complex and changing program policies which require computer systems to adapt to rapid policy changes. Embodiments of the present disclosure also provide an automated and accurate entity identification and risk assessment process.

The present disclosure provides systems and methods of assessing risk using a computer. According to one embodiment, a computer-based system 100 is provided for assessing risks. As illustrated in FIG. 1, the computer-based system 100 includes a computer 110. As discussed above, a computer 110 can be a server computer. A server computer should be understood to refer to a service point which provides processing, database, and communication facilities. By way of example, and not limitation, the term server can refer to a single, physical processor with associated communications and/or data storage and/or database facilities, or it can refer to a networked or clustered complex of processors and associated network and/or storage devices, as well as operating software and one or more database systems and/or applications software systems (which can be implemented as modules and/or engines) which support the services provided by the server.

Several non-limiting examples of a computer 110 or 600 are a personal computer (e.g., desktop computers or laptop computers), personal digital assistants (PDAs), wireless devices, cellular telephones, internet appliances, media players, home theater systems, media centers, and the like. The computer 110 or 600 may also include a plurality of computers connected to teach other through a network. For the purposes of this disclosure, a computing device includes a processor and memory for storing and executing program code, data and software, and may be provided with an operating system that allows the execution of software applications in order to manipulate data. The computer 110 or 600 can include one or more input devices, e.g., keyboard, keypad, mouse, etc. and input device interface, for example: a display, such as a screen or monitor, which can be specified using any of a number of languages, including without limitation, a markup language such as Hypertext Markup Language, scripts, applets and the like.

Additionally, the computer 110 may receive and/or transmit personal information, risk information, assessment information, and/or adjudication information from one or more users 170 and/or clients 180 through storage media, wired connections, wireless connections, the internet, Internet, or any other type of communication network using transmission control protocol (TCP) and Internet Protocol (IP). Users 170 may utilize the computer via an input device, such as a keyboard or a mouse. Clients 180 may be computers connected to computer 110 through a network. For example, the computer 110 may receive or transmit these types of information through a flash memory drive, disc media (i.e., CD, DVD, Blu-Ray), a wired network connection (i.e., the internet), or a wireless connection.

The computer 110 may include an enrollment module 120, a data aggregation module 130, a risk assessment module 140, an adjudication module 190, and a memory 150. The modules are not required to be on a single computer 110. The modules may each be located on the computer 110, or may be located on separate computers connected to the computer 110 over a network, such as the Internet. The memory 150 may be a fixed disk where an operating system, application programs, and/or data may be stored. For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application and implemented by at least one processor of a computing device.

The enrollment module 120 may receive, at the computer, personal information regarding at least one entity. As used herein, the term "entity" refers to any person, company, group of people, organization, government entity, and the like, that may pose any kind of risk. For example, an entity may be a person, a group of people, an organization, a corporation, a co-operation, an association, a country, a state, a city, a municipality, etc. As used herein, the term "personal information" refers to any information that can uniquely identify an entity. For example, if the entity is a single person, personal information may include biographic information (e.g., name, address, phone number, social security number, birth date, company's stock symbol, etc.), biometric information (e.g., fingerprints, face recognition, DNA, hand and palm geometry, iris recognition, odor/scent, etc.), and the like. Personal information may refer to an single unique identifier, such as a fingerprint, or several pieces of information that when taken together can refer only to a single entity, i.e., a name, birth date, and address. Additionally, personal information may refer to biographic information and biometric information.

The data aggregation module 130 may receive, at the computer, risk information regarding the entity according to the personal information from at least one data source 160. As used herein, the term "risk information" refers to any quantifiable information that may be considered as indicative of risk. For example, risk information may include criminal history, civil history, terrorist watch lists, traffic violations, loan or debt delinquencies, outstanding wants or warrants, academic disciplinary history, and/or immigration status. Risk information may also include accusations relating to the previously mentioned types of risks. For example, a security company may want to know whether potential employees have a criminal record. In this example, risk information would include any information that relates to the criminal history of a job applicant. In another example, the federal government may want to know what health care companies have unacceptably high levels of fraud, or accusations of fraud, relating to insurance claims. In this example, risk information may include any information that relates to fraud claims or accusations relating to the health care companies. In another example, a company may want to know whether a country poses a risk for investment purposes. In this example, risk information may include inflation or deflation rates, debt amount, debt to GDP ratio, interest rates, etc.

For example, the data source 160 may be a database, electronic documents, the internet, paper files, and the like. The risk assessment module 140 may convert the risk information to assessment information. The term "assessment information" as used herein refers to risk information that has been quantified. For example, if a job applicant has a criminal background, each criminal charge, disposition, and punishment may be quantified. The conversion from risk information to assessment information may be manual or automatic. Risk information may be converted from unstructured data sources using a non-standard data vocabulary and complicated data semantics to assessment information using standardized vocabulary and values. The memory 150 may store the personal information, the risk information, and/or the assessment information on the computer 110.

According to another embodiment, the system 100 may also include an adjudication module 190 to determine a level of risk corresponding to the at least one entity according to the assessment information. The adjudication module 190 may be accessible to a user 170 or a client 180 through storage media, wired connections, wireless connections, the internet, Internet, or any other type of communication network using transmission control protocol (TCP) and Internet Protocol (IP). The computer 100 may include the adjudication module 190, or the adjudication module 190 may be on storage media, the internet, flash drives, external hard drives, and the like.

The risk information may be converted to assessment information using an algorithm. The algorithm may use logical expressions to automatically convert unstructured text into numeric values. The algorithm may be developed in the following manner in a criminal background context. Criminal backgrounds are usually obtained using rap sheets that may contain information spanning several decades, jurisdictions, states, etc. Each jurisdiction may add information to the rap sheets in an unstructured non-standardized manner. For example, each jurisdiction may have a unique way of classifying the same crime, the classifications and crimes may change over time, there may be typographical errors that are never fixed, and other various differences or errors that cause inconsistencies in the data.

Figure 5:
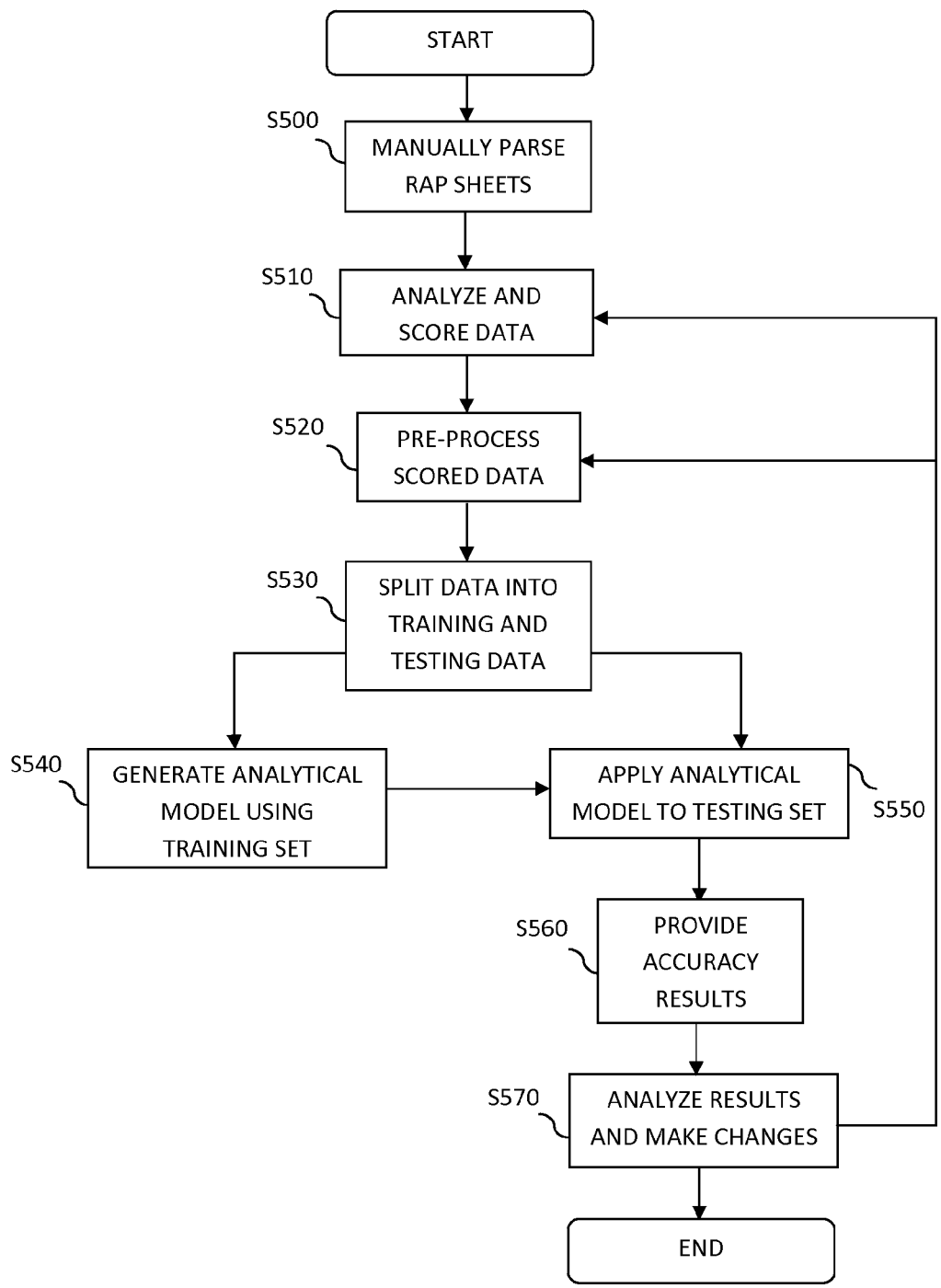
FIG. 5 is a flow chart illustrating the creation of a predictive model from which the algorithm is developed.

To develop the algorithm to automatically convert the inconsistent data (risk information) to standardized assessment information, a training model may be built. FIG. 5 is a flow chart illustrating the creation of a predictive model from which the algorithm is developed. The predictive model may be a statistical pattern learning model which is trained to predict classifications by using examples of text already classified. The predictive model may be built by parsing a number of rap sheets manually to extract the following pieces of data: charges, arrest dates, court dates, disposition, sentences, etc (operation S500). This data may then be analyzed and scored, i.e., standardized to account for any inconsistencies (operation S510). The scoring may be done by an expert in the subject matter. In the present example, involving rap sheets, a subject matter expert may be a retired police officer, FBI agent, corrections officer, and the like. The expert may go through rap sheets, line by line, standardizing the unstructured data. The scored data may then be pre-processed to remove extraneous information from the standardized data (operation S520). The pre-processing may include replacing specific words, tokens, or phrase with more text-minding friendly words, tokens, and phrases. The rap sheets may be split into a testing set and a training set (operation S530). Logical expressions may be developed as an analytical model based on the manual scoring and pre-processing of the rap sheets as part of the development of the predictive model (operation S540). The algorithm may utilize these logical expressions to convert the risk information to assessment information.

Once the predictive model is developed, new rap sheets may be automatically processed by the algorithm using the logical expressions of the predictive model to produce testing data. The predictive model may then process new rap sheets to produce testing data to predict the assessment information according to the logical expressions (operation S550). The accuracy of the prediction of the assessment information may be provided to a user based on the predictive model's confidence in the accuracy of the automatic conversion from risk information to assessment information (operation S560). The accuracy may be provided as a confidence factor, which refers to the predictive model's confidence that the automatic version is accurate. The testing data may be manually reviewed by the experts to determine the accuracy of the training model and to adjust the logical expressions to improve accuracy (operation S570). The process may return to operations S510 and S520 in order to improve the accuracy of the predictive model using additional rap sheets. The more testing data the predictive model processes, the more accurate the predictions become due to improved logical expressions. The predictive model may be part of the risk assessment module 140 and may be updated to improve the accuracy of the predictive model when the risk assessment module 140 is utilized.

The computer system 100 may be used to assess risk or as a quality check for manual risk assessment. Risk information that has been manually processed for adjudication may be fed into the computer system 100 to automatically determine the level of risk using the predictive model. The manually generated risk assessment may be compared against the automatically generated risk assessment. The accuracy level of the manual risk assessment may be determined by this comparison. The person making the manual risk assessment may then learn from the differences between the manual risk assessment and the automatic risk assessment thereby improving the quality of the manual risk assessment.

According to another embodiment, the risk information may include at least one of the following: infraction information, punishment information, and disposition information. The infraction information, punishment information, and disposition information may all correspond to the personal information of the at least one entity. As used herein, the term "infraction information" refers to any information that may be indicative of risk. As used herein, the term "punishment information" refers to the severity of the infraction. As used herein, the term "disposition information" refers to a resolution of the infraction information, such as guilt or innocence. For example, in a criminal setting, infraction information may correspond to criminal charges that may be classified using the National Crime Information Center (NCIC) codes. In this example, punishment information may correspond to the severity of the charge, i.e., whether the criminal charges constitute misdemeanors or felonies. Additionally, disposition in a criminal setting may include whether the charge resolved with a finding of convicted, not convicted, or if the resolution is unknown. The risk information may include different types of information that correspond to the type of risk. For example, infraction information, punishment information, and disposition information may apply to criminal information. Additionally, the risk information may include travel information which may include countries visited and dates of those visits.

The risk information can include additional information. For example, in a criminal setting the risk information may include whether a person has served any jail time, whether any probation is part of the sentence, if any fines or restitution requirements have been levied, etc. This type of risk information may be used by the computer 110 to infer disposition information and punishment information. For example, if the person has served jail time and punishment information indicates the person was charged with a felony, but the disposition information is unknown, the computer 110 can infer that the person was convicted based on the fact the person served jail time for the felony. Additionally, if the person has been convicted and fined over $500, but the punishment information relating to the severity of the charge is unknown, the computer 110 can infer that the person was charged with a felony based on the amount of the fine.

According to another embodiment, the infraction information, punishment information, and disposition information may be converted to standardized quantifiable values based on the risk information gathered from the at least one data source 160. The conversion to standardized quantifiable values may be manual or automatic. The computer 110 may automatically convert the infraction information, punishment information, and disposition to standardized quantifiable values using an algorithm in the risk assessment module 140. The algorithm may be specifically programmed to correspond to the type of risk information, i.e., criminal history, civil history, terrorist watch lists, traffic violations, loan or debt delinquencies, outstanding wants or warrants, academic disciplinary history, and/or immigration status. The algorithm may use logic expressions to convert the risk information to assessment information. For example, a logic expression to convert infraction information, in this example a criminal charge, to "SEXUAL_ASSAULT" or NCIC code "11" may be: "SEX(UAL)?\s+ASS(UA|AU)LT." The logic expression may include other alternative or potential spellings or phrases that convey a similar charge, such as "forcible sexual intercourse." Additionally, a logic expression may convert punishment information to "FELONY," "MISDEMEANOR," or "UNKNOWN." Additionally, a logic expression may convert disposition information to "CONVICTED," "NOT CONVICTED," or "UNKNOWN."

Additionally, punishment information or disposition information may be determined according other portions of the risk information. For example, the risk information regarding a criminal charge may include jail time, which can be converted into punishment information and disposition information. In this example, punishment information may be determined according to a punishment length. The punishment length may be converted to standardized format using the following logic expression: "(DAS?|DAYS?)(?:\s|\p[Punct]|S)." This logical expression may be interpreted as: find any substring beginning with the letters "DA" optionally followed by the letter "S" or beginning with the letters "DAY" optionally followed by the letter "S" where following letters must be either a "whitespace" character, some punctuation character, or the end of the string. When the text indicating punishment length falls within the parameters of the logical expression, the first group of characters is replaced by a standardized code corresponding to a punishment length. The standardized punishment length is then converted to punishment information. Additionally, if jail time has been served, the disposition information may be inferred as "CONVICTED."

The computer-based system 100 may assess more than one risk or assess different types of information simultaneously. More than one computer-based system 100 may assess one or more risks in tandem with one another. For example, if a risk assessment takes more than one type of risk information, such as criminal history and immigration status, a computer-based system 100 may include multiple risk assessment modules to convert both types of risk information into assessment information. Alternatively, a first computer-based system may process the criminal history risk information, and a second computer-based system may process the immigration status risk information.

According to another embodiment, the assessment information may include a standardized infraction code that corresponds to the infraction information, a punishment code that corresponds to the punishment information, and a disposition code that corresponds to the disposition information. According to another embodiment, the assessment information may be quantified by assigning numerical values as the standardized infraction code, the punishment code, and the disposition code.

For example, in a criminal setting, person A may have been charged with "intimidating a witness." This infraction information may be automatically converted to standardized infraction code "THREATS" which corresponds to NCIC code 16. If person A faces more than 1 year (365 days) in prison for such a criminal charge, the punishment information may be automatically converted to standardized punishment code "FELONY." If person A is found guilty, the disposition information is converted standardized disposition code "CONVICTED." Therefore, in this example, person A has been charged with "intimidating a witness," faces over 365 days in prison, and has been "convicted." Accordingly, the system 100 may automatically convert the infraction information "intimidating a witness" to "THREATS," the punishment information from ">365 days" to "FELONY" and from "guilty" to "CONVICTED." Furthermore, the system 100 may automatically convert the infraction information from "THREATS" to "16" to correspond to the NCIC code, the punishment information from "FELONY" to "1" as a ternary value, and "CONVICTED" to "2" as a ternary value. Depending on a potential sentence length, the punishment information may be converted to "MISDEMEANOR" or "0," and if the punishment information is not clear, the punishment information may be converted to "UNKNOWN" or "2." Additionally, if person A is found not guilty, the disposition information may be converted to "NOT CONVICTED" or "1," and if the disposition information is not clear, the disposition information may be converted to "UNKNOWN" or "0."

According to another embodiment, the level of risk may correspond to the at least one entity is determined according to adjudication parameters received by the adjudication module 190. For example, a client 180 may be a security company looking to hire a new employee. The client 180 may assess the risk of job applicants by setting adjudication parameters by which to judge the applications. The adjudication parameters may be easily changeable logical expressions that correspond to the standardized vocabulary and values of assessment information. The adjudication parameters can rapidly adapt to complex and frequently changing policies of the user 170 or the client 180. The level of risk may be a threshold where if a job applicant fails to conform to the adjudication parameters set by the client 190, the level of risk is above the threshold. If a job applicant conforms to the adjudication parameters set by the client 190, the level of risk is at or below the threshold. The adjudication parameters may include a period of time elapsed from when a particular infraction occurred. If the job applicants exceed the adjudication parameters the security company is willing to accept, than the level of risk corresponding to those applicants. Additionally, the level of risk may be quantified according to the adjudication parameters. For example, the client 190 may set adjudication parameters where a felony is 10 points and a misdemeanor is 5 points. Accordingly, the client 190 may set an acceptable risk level at 24 points, thus any job applicant whose criminal record totals more than 25 points exceeds the quantified risk threshold. In this example, risk information that exceeds the risk threshold may be either a temporary or a permanent disqualifying offense. For example, the client 190 may determine that, for example, a felony that occurred over 10 years ago should not be counted in adjudicating the risk because of the lapse of time since the infraction.

According to another embodiment, the adjudication parameters may be received from a user 170 and may be manually input into the computer 110 or received from a client 180 over a network. The network include wired connections, wireless connections, the internet, Internet, or any other type of communication network using transmission control protocol (TCP) and Internet Protocol (IP).

FIG. 2 illustrates a method of assessing risks using a computer. In operation S200, personal information regarding at least one entity is received at the computer. In operation S210, risk information regarding the at least one entity is gathered according to the personal information from at least one data source 160. In operation S220, the risk information is converted to assessment information. In operation S230, the personal information, the risk information, and/or the assessment information are stored in a memory 150 on the computer 110. The conversion of risk information to assessment information may be manual or automatic.

Figure 3A:
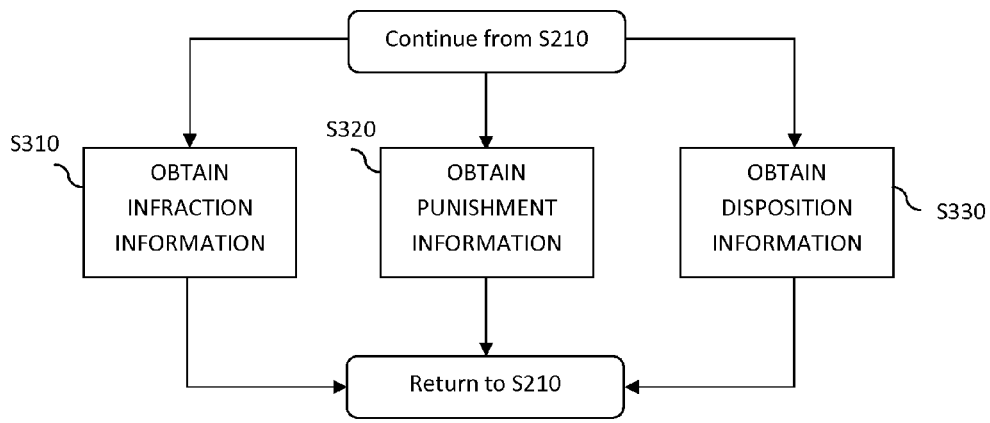
FIG. 3A is a flow chart illustrating a method of gathering risk information according to one or more embodiments of the present disclosure.

FIG. 3 illustrates a method of gathering of the risk information (operation S210). The gathering of risk information in operation S210 may include obtaining infraction information (operation S310), punishment information (operation S320), and disposition information (operation S330) that correspond to the personal information of the at least one entity.

Figure 3B:
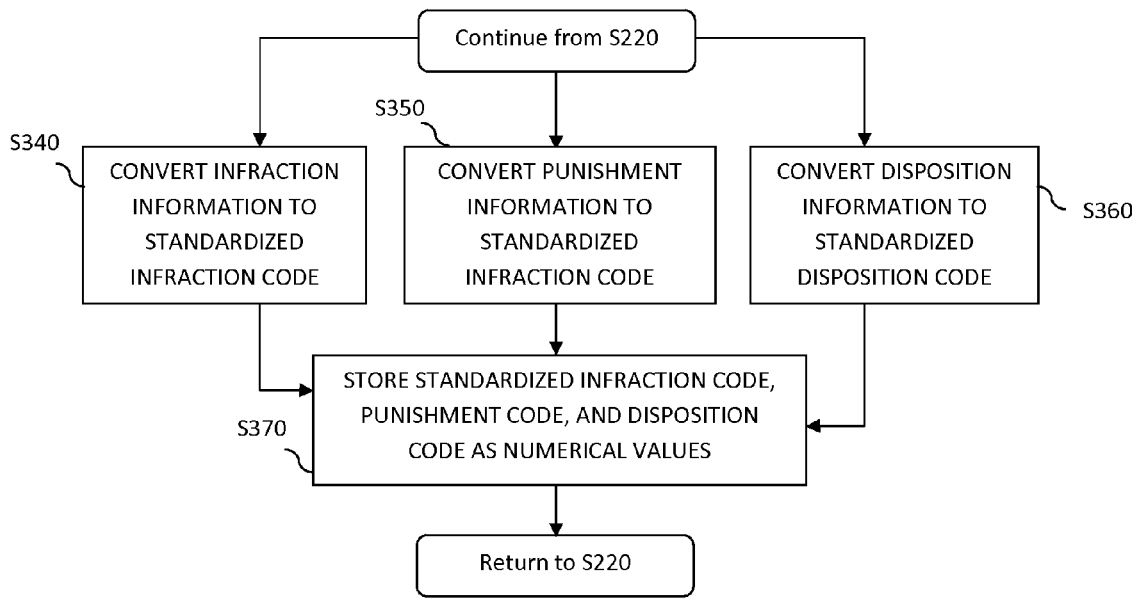
FIG. 3B is a flow chart illustrating a method of converting risk information to assessment information according to one or more embodiments of the present disclosure.

According to another embodiment, the conversion of the risk information to assessment information (operation S220) may include converting the infraction information, punishment information, and disposition information to standardized quantifiable values based on the risk information gathered from the at least one data source 160. FIG. 3B illustrates a method of converting risk information to assessment information (operation S220). The conversion of risk information to assessment in operation S220 may include converting the risk information into assessment information may include a standardized infraction code that corresponds to the infraction information (operation S340), a punishment code that corresponds to the punishment information (operation S350), and a disposition code that corresponds to the disposition information (operation S360).

According to another embodiment, the method may further include storing the standardized infraction code, the punishment code, and the disposition code on the computer 110 as numerical values (operation S370). According to another embodiment, the risk information may include criminal history, civil history, terrorist watch lists, traffic violations, loan or debt delinquencies, outstanding wants or warrants, academic disciplinary history, and/or immigration status.

According to another embodiment, the method may further include determining a level of risk (operation S250) corresponding to the at least one entity according to the assessment information. According to another embodiment, the level of risk corresponding to the at least one entity may be determined according to adjudication parameters. According to another embodiment, the method may further include receiving the adjudication parameters (operation S240) by inputting the adjudication parameters into the computer 110 or receiving the adjudication parameters from a client 180 over a network. The adjudication parameters may be received at the computer 110 before the process illustrated in FIG. 2 begins.

Figure 4:
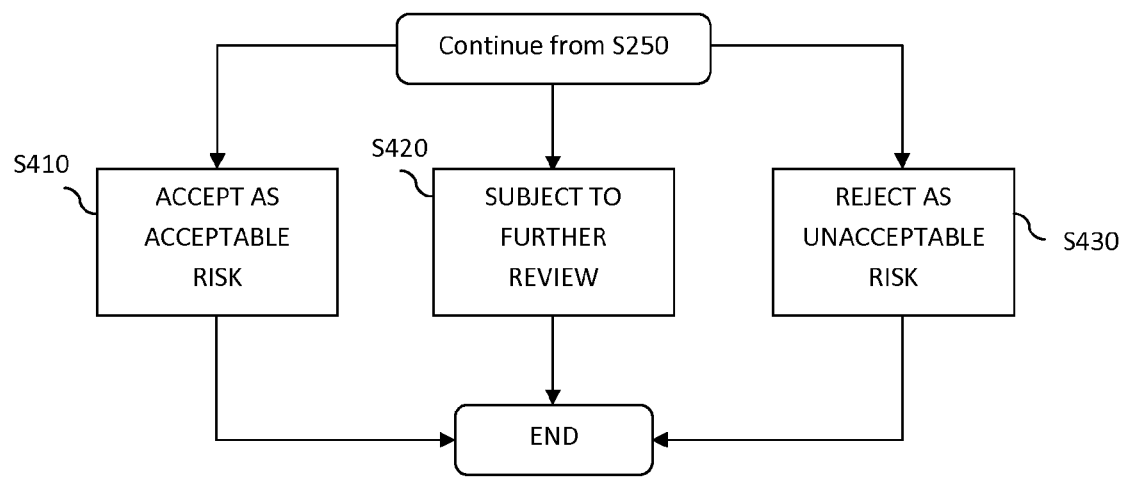
FIG. 4 is flow chart illustrating a method of determining a level of risk according to one or more embodiments of the present disclosure.

According to another embodiment, a method of assessing risks using a computer 110 is provided. The method includes receiving biographical information (operation S200) regarding at least one person at the computer 110. In operation S210, criminal information regarding the at least one person according to the biographical information is gathered from at least one data source 160, wherein the criminal information includes information relating to infractions, punishments for the infractions, and dispositions of the infractions. In operation S220, criminal information is automatically converted to assessment information, wherein a standardized numerical value is assigned to each infraction, a value of misdemeanor or felony is assigned to the punishment for each infraction, and a value of convicted, not convicted, or unknown is assigned to the disposition of each infraction. In operation S230, the biographical information, the criminal information, and the assessment information is stored on the computer 110. In operation S250 a level of risk corresponding to the at least one person according to the assessment information is determined. FIG. 4 illustrates a method of determining a level of risk (operation S250). In operation S410, the at least one person is accepted, in operation S420 the at least one person is subjected to further review, and in operation S430 the at least one person is rejected based on the level of risk. With regard to operation S420, the at least one person may be provisionally rejected based on a felony conviction, however the at least one person may subsequently be accepted in operation S410 if the felony that occurred over 10 years ago and the adjudication parameters do not disqualify applicants for felony convictions that occurred more than 10 years ago.

According to another embodiment, a computer-based system 600 is provided for determining an entity's identity and assessing risks related to the entity's identity. The computer-based system 600 may include a tracking module 610, an information module 620, a risk assessment module 630, a memory 640, an identity determination module 660, and/or a web-based module 670. The modules may each be located on a computer or may be located on separate computers connected via the computer-based system 600 over a network, such as the Internet. The memory 640 may be a fixed disk where an operating system, application programs, and/or data may be stored. The identities of entities 650 may be compiled and stored as a data source 680. The computer-based system 600 may track all processes of the computer-based system in a log that may be stored on the memory 640.

Figure 6:
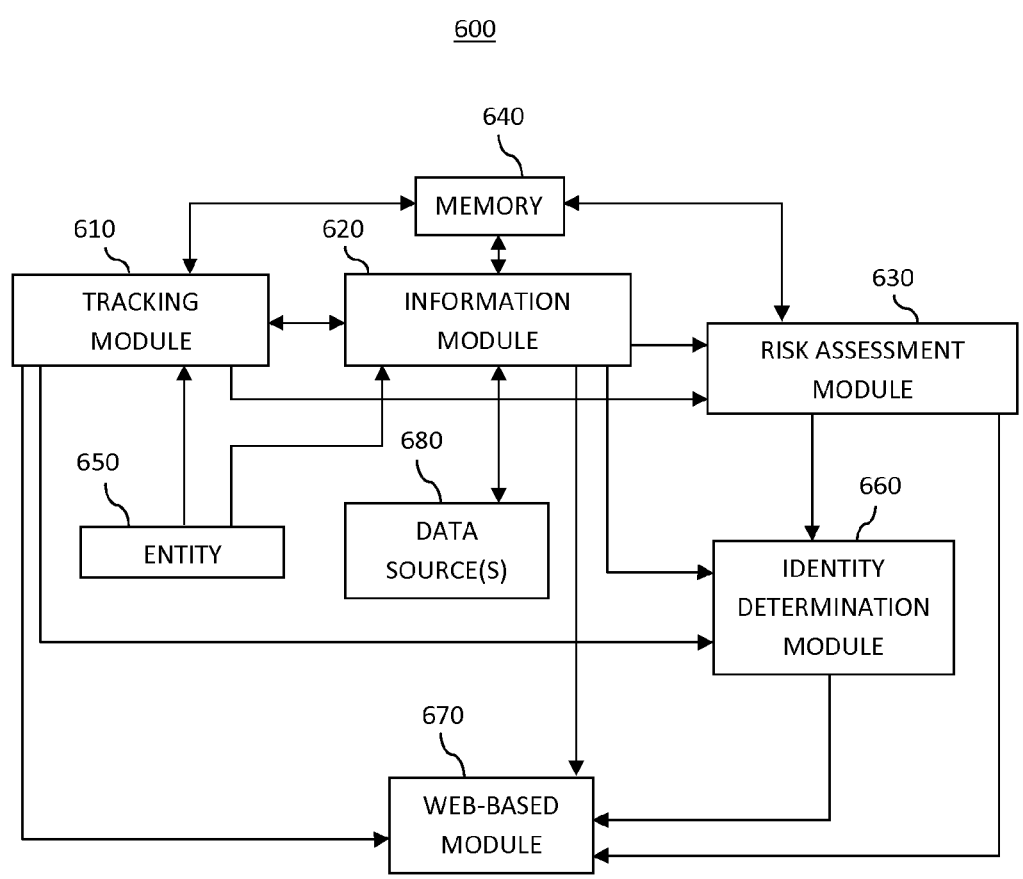
FIG. 6 is a block diagram illustrating a computer system to determine an entity's identity and assess risks related to the entity's identity according to one or more embodiments of the present disclosure.

As illustrated in FIG. 6, the computer-based system 600 may receive and/or transmit biographic information and/or biometric information from one or more entities 650 or data sources 680 through storage media, wired connections, wireless connections, the internet, Internet, or any other type of communication network using transmission control protocol (TCP) and Internet Protocol (IP). Entities 650 may utilize the computer-based system 600 via an input device, such as a keyboard or a mouse. Data sources 680 may be computers connected to computer-based system through a network. For example, the computer-based system 600 may receive or transmit these types of information through a flash memory drive, disc media (i.e., CD, DVD, Blu-Ray), a wired network connection (i.e., the internet), or a wireless connection. Multiple computer-based systems 600 may be connected to receive or transmit information through the above means.

The tracking module 610 may record, at a computer, encounters an entity 650 has with the computer-based system 600. As used herein, the term "encounter" refers to any interaction between an entity and the computer-based system 600. The tracking module 610 of the computer-based system 600 may record consecutive recurring encounters that may be constantly triggered by interactions between the entity 650 and the computer-based system 600. The tracking module 610 may keep track of previous encounters the entity 650 has with more than one computer-based system 600. The tracking module 610 may keep a record of all previous encounters with the entity 650 that may be used to detect patterns of encounters that may suggest risks, such as potential fraud or security threats. When an entity 650 encounters the computer-based system 600, the tracking module 610 may record the encounter and generate encounter information regarding the recorded encounter. During each encounter, the tracking module 610 collects personal information relating to the entity 650, information relating to the nature of the encounter, and information regarding which computer-based system 600 the entity 650 encounters. The personal information of the entity 650 may include biographic information and biometric information relating to the entity 650. For example, if the computer-based system 600 is used to verify the identity or assess the risk associated with an airline passenger (entity 650) checking in for a flight, the encounter information may include that the entity 650 tried to board a plane as well as any details about the entity's interaction with an airport representative. In this example, an airport representative (such as a ticketing agent) may record any information about the encounter that may be pertinent to assessing risk or verifying the entity's identity.

The information module 620 may gather, at a computer, biographic information and biometric information relating to the entity's 650 identity. The information module 620 may receive the biographic information and the biometric information from the tracking module 610. The information module 620 may detect changes in the biographic information and the biometric information based on previously recorded encounters. Changes in the biographic information and the biometric information may be detected by comparing this information in a present encounter with that of a previous encounter. Any discrepancy between these sets of information between encounters qualifies as a change and is detected by the information module 620. If either the biographic information or the biometric information has changed between encounters, the information module 620 generates an event relating to the present encounter during which change information is detected. As used herein, the term "event" refers to a detection of a change in the biographic information or biometric information. An event may be classified according to the level of importance. The classifications event can range in seriousness and may be expressed as numerical rankings, color coded rankings, termed rankings, etc. The classifications may be expressed as numerical rankings with a range of 1 through 10, where 1 refers to a mild event that is mostly insignificant whereas 10 refers to a serious event that deserves immediate attention. The classifications may be expressed as color coded rankings with a range of white to red where white refers to a mild event and red refers to a serious event. The classifications may be expressed as termed rankings, such as "mild" referring to a non-serious event and "serious" referring to a serious event. For example, if the biographic information of an entity 650 includes an address, and the address of the entity 650 has changed between encounters, this may result in a ranking of 1 or mild or yellow, depending on how the classifications are expressed.

The risk assessment module 630 may, at a computer, evaluate risks associated with the entity 650 according to previously recorded encounters and assessment parameters. As used herein, the term "assessment parameters" refers to any information that can be utilized to assess a risk. The risk assessment module 630 may use discrepancies between previous encounters to evaluate the risks associated with the entity 650. For example, if the biometric information of an entity 650 changes between encounters, the risk assessment module 630 may determine that the entity 650 presents a high risk. The risk assessment module 630 may confirm the identity of the entity 650 and assess the risk associated with the entity 650 whether the identity of the entity 650 determined by a present counter matches or does not match that of previous encounters. The risk assessment module 630 may determine the entity's 650 propensity for fraud based on the assessment parameters. The assessment parameters may include: configurable business rules, predictive models, debarment lists, etc. Each computer-based system 600 may utilize different assessment parameters based on the particular types of risks that the computer-based system 600 is targeting. As with the adjudication parameters of the adjudication module 190, the assessment parameters may be easily changeable logical expressions so that they can be rapidly adapted or configured according to complex and frequently changing policies or environments depending on what person or organization is utilizing the computer-based system 600. The memory 640 may store the personal information, the detected changes in the personal information, and the encounter information.

The computer-based system 600 may provide fraud and deceit related measures, such as opening investigations on selective entities 650, suggesting vetting sources that should be consulted (or re-consulted), updating specific data sources 680. The computer-based system 600 may signal the person or organization utilizing the computer-based system 600 to initiate an investigation in to an entity's 650 identity if the information module 620 detects changes in the biographic information or the biometric information based on previously encounters recorded by the tracking module 610. The computer-based system 600 may generate a list of sources for the person or organization utilizing the computer-based system 600 to consult to determine whether the information module 620 is accurate in detecting a change in the biographic information or the biometric information of the entity 650. The tracking module 610 may be updated with new biographic information and/or biometric information if it is determined that the change in the biographic information and/or the biometric information is accurate and reflects a change in the entity's 650 personal information without changing the entity's 650 identity. For example, the information module 620 may detect a change in biometric information relating to an entity 650, such as an iris scan. A change in an entity's 650 iris pattern may or may not be an indication of identity fraud. If, for example, an entity 650 has had corrective laser eye surgery, the iris scan of the present encounter may not match up with an iris scan of a previous encounter. Therefore, upon verification that the identity of the entity 650 has not changed between encounters, the iris scan of the entity 650 may be updated so that future encounters use the post-surgery iris scan to detect any changes in the biometric information.

The identity determination module 660 may, at a computer, determine the identity of the entity 650 according to the biographic information and the biometric information, the encounter information, and the evaluated risks of the risk assessment module 630. If the personal information has not changed between encounters, the identity determination module 660 may conclude that the entity 650 is who the identity claims to be. If the personal information has been changed between encounters, the identity determination module 660 may verify that while the personal information has changed, the identity of the entity 650 has not.

The web-based module 670 may, at a computer, display encounter information, biological information and biometric information, changes in the biological information and the biometric information, the evaluation of the risks, and the determined identity of the entity 650. The web-based module 670 may display these types of information on a computer through storage media, wired connections, wireless connections, the internet, Internet, or any other type of communication network using transmission control protocol (TCP) and Internet Protocol (IP). The web-based module 670 may also display a log of events relating to an entity 650 and its interaction with the computer-based system(s) 600. The web-based module 670 may allow a person or organization to search through encounters to find information regarding a particular encounter or a particular entity 650. The web-based module 670 may also allow a person or organization utilizing the computer-based system 600 to manage debarment lists. For example, a person or organization utilizing the computer-based system 600 may add an entity 650 to a debarment list based on an encounter using the web-based module 670. The web-based module 670 may package all the above information in XML to contain all details about a current encounter, previous encounters, and fraud assessments. Once the web-based module 670 packages all the above information, the encounter of the entity 650 with the computer-based system 600 ends.

Figure 7:
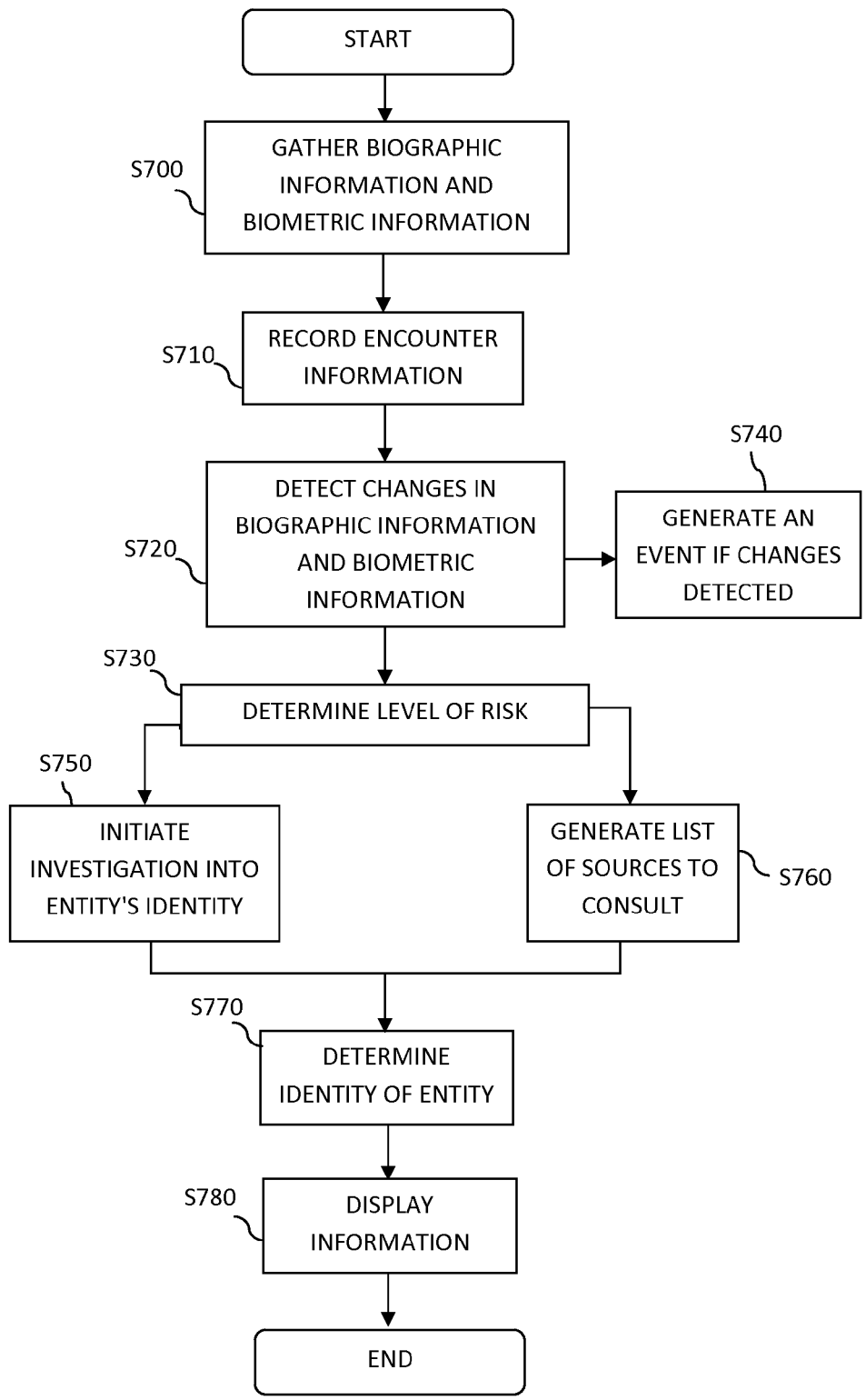
FIG. 7 is a flow chart illustrating a method of determining an entity's identity and assessing risks related to the entity's identity according to one or more embodiments of the present disclosure.

FIG. 7 illustrates a method determining an entity's identity and assessing risks related to the entity's identity using a computer. In operation S700, personal information, in the form of biographical information and biometric information, relating to the entity's 650 identity is gathered during a first encounter. In operation S710, encounter information regarding the first encounter is recorded. In operation S720, changes in the biographic information and the biometric information are detected by comparing the biographic information and the biometric information from the first encounter with second biographic information and biometric information from a second encounter. In operation S730, risks, or a level of risk, associated with the entity are determined according to the encounter information and assessment parameters. The first biographic information and the biometric information, the encounter information, and the second biographic information and the biometric information may be stored in memory 640 (not illustrated).

In operation S740, an event may be generated if the biographic information or the biometric information of the second encounter is different from that of the first encounter. The event may be classified according to a level of importance. After risks associated with the entity are determined in operation S730, the method proceeds to either operation S750 or operation S760. In operation S750, an investigation into an entity's 650 identity is initiated if changes in the biographic information or the biometric information are detected. In operation S760, a list of sources to consult is generated to determine whether the detected changes in the biographic information or the biometric information are accurate. The encounter information may be updated if the accuracy of the second biographic information and the biometric information has been verified (not illustrated). The determination of the risks associated with the entity 650 in operation S730 may include determining the entity's 650 propensity for fraud based on the assessment parameters. The assessment parameters may include: configurable business rules, predictive models, debarment lists, etc. Debarment lists include, but are not limited to, terror watch lists, do not fly lists, sex offender registries, Medicare/Medicaid exclusion lists, and the like.

In operation S770, the identity of the entity 650 may be determined according to the first and second biographic information and the biometric information, the encounter information, and the determined risks associated with the entity 650. In operation S780, the encounter information, the first and/or second biological information and biometric information, the determined risks, and the determined identity of the entity 650 may be displayed using a web-based module.

According to another embodiment, the method of determining an entity's identity and assessing risks related to the entity's identity can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, Blu-Rays, flash drives, magnetic tapes, floppy disks, and optical data storage devices. The computer-readable recording medium can also be distributed over network coupled computer systems so that the computer-readable code is stored and executed in a distributed fashion. Also, functional programs, codes, and code segments to accomplish the present disclosure can be easily construed by programmers skilled in the art to which the present disclosure pertains.

Unless defined otherwise, all technical terms used herein have the same meaning as commonly understood by one of ordinary skill in the art to which this invention belongs. Any methods and materials similar or equivalent to those described herein also can be used in the practice or testing of the present disclosure It must be noted that as used herein and in the appended claims, the singular forms "a", "and", and "the" include plural references unless the context clearly dictates otherwise.

EXAMPLES

The following examples are put forth so as to provide those of ordinary skill in the art with a complete disclosure and description of how to make and use the present disclosure, and are not intended to limit the scope of what the inventors regard as their invention.

Example 1

Debarment Rule Set

The computer-based system 600 may include a rule set regarding a debarment lists where risk associated with an entity 650 may be determined according to the debarment list. For example, when an entity 650 encounters the computer-based system 600, the computer-based system 600 may determine that an entity 650 is on a debarment list and therefore the entity 650 may be prevented from engaging in a prohibited activity. The debarment lists are composed of entities 650 whose identities have been confirmed and verified. The computer-based system 600 confirms an entity's 650 identity, and then compares the entity's 650 identity with the identities included in the debarment lists.

For example, debarment list rules may include the following. When the confirmed identity of an entity 650 during an encounter can be found on any debarment list, create a negative (red score) risk or fraud assessment result. When the confirmed identity of an entity 650 during an encounter can be found on a "sexual predator" debarment list, create a negative (red score) risk or fraud assessment result that indicates fraud. When the confirmed identity of an entity 650 during an encounter matches more than two debarment lists, score the risk or fraud assessment result as a negative (red score). When the confirmed identity of an entity 650 during an encounter matches 1 or 2 debarment lists, score the risk or fraud assessment result as potentially fraudulent (yellow). When the confirmed or unconfirmed identity of an entity 650 during an encounter matches any one on a debarment list, the fraud assessment should be potentially fraudulent (yellow).

As illustrated above, the debarment list rules are configurable according to the specific needs and goals of the person or organization utilizing the computer-based system 600.

Example 2

Encounter Rule Set

In this example, two organizations in separate states utilize computer-based systems 600 to monitor driver license entitlement systems. The following rules may be exercised in such a scenario.

When the confirmed identity of an entity 650 during an encounter is found within previous encounters related to different computer-based systems 600, then a negative fraud assessment should be made. When the confirmed identity of an entity 650 during an encounter is found within previous encounters with an overall negative assessment then the overall assessment of the present encounter should also be negative.

As illustrated above, the encounter rules are configurable according to the specific needs and goals of the people or organizations utilizing the computer-based systems 600.

Example 3

Identity Mismatch Rule Set

In this example, the computer-based system 600 can generate scores for matching biographic information of an entity 650 to a previous encounter, biometric information of an entity 650 to a previous encounter, etc. The following fraud detection rules may be utilized.

When the matching scores on any of the components of the personal information of previous encounters regarding an entity's 650 identity differs from the present encounter by more than 40%, the entity's 650 identity in the present encounter is flagged as potentially fraudulent (yellow). When the matching scores on any of the components of the personal information of previous encounters regarding an entity's 650 identity differs from the present encounter by more than 60%, the entity's 650 identity in the present encounter is flagged as definitely fraudulent (red).

The rules can be developed to be as complicated or as simple as the organization or person utilizing the computer-based system 600 wishes. For example, take a hypothetical scenario where entity A applies to a security-sensitive program that uses both fingerprints and biographical information. The security-sensitive program utilizes a computer-based system (System X) to record entity A's encounter. Since entity A has not encountered system X before, entity A's fingerprints and biographical information are recorded and presumed to be accurate. System X then runs a risk assessment on entity A, and concludes that entity A should be denied access to the security-sensitive program because of a criminal record. Subsequently, entity A reapplies to a similar program, and to avoid rejection, uses his brother, entity B, to encounter the computer-based system 600. In this scenario, entity B exactly resembles entity A in all physical attributes and has been previously approved to access the security-sensitive program. Entity A has entity B provide entity A's biographic information and entity B's fingerprints so that the criminal background check will come back clean.

In this scenario, the following rule may be utilized to catch the attempted fraud. When the biographic information and the biometric information of a entity 650 matches two different entities on the computer-based system 600 with a confidence factor greater than 70%, the identity of entity 650 is flagged as fraudulent (red).

What is claimed is:

1. A computer implemented method of assessing risks related to changes in information for an entity, the method comprising:
   recording, in a storage device, consecutive recurring encounters with the entity;
   gathering biographic information and biometric information relating to the entity's identity from each of the encounters;
   comparing, in a processor, the biographic information and the biometric information obtained from each of the consecutive recurring encounters;
   detecting changes in the biographic information and the biometric information between the compared encounters;
   determining, by the processor, a risk level associated with the entity based on the detected changes in the biographic information and the biometric information between the compared encounters; and
   storing the determined risk level and the dectected changes in the biographic information and the biometric information from the compared encounters in a memory on the computer.

2. The method of claim 1, wherein the determination of the risks associated with the entity includes determining the entity's propensity for fraud based on the assessment parameters.

3. The method of claim 1, wherein the assessment parameters include at least one of configurable business rules, predictive models, and debarment lists.

4. The method of claim 1, wherein determining risks associated with the entity comprises generating a matching score of the biographic and biometric information of the second encounter to the biographic and biometric information from the first encounter.

5. The method of claim 1, wherein the first encounter comprises an encounter during a first time period and the second encounter comprises an encounter at a subsequent time period.

6. The method of claim 1, wherein the first encounter comprises an original encounter and the second encounter comprises a plurality of encounters subsequent to the original encounter.

7. The method of claim 1, wherein determining risks associated with the entity comprises classifying the detected changes in the biographic information and the biometric information according to a level of importance.

8. The method of claim 7, wherein classifying the detected changes in the biographic information and the biometric information comprises assigning a numerical ranking to the detected changes.

9. The method of claim 7, wherein classifying the detected changes in the biographic information and the biometric information comprises assigning a color coded ranking to the detected changes.

10. The method of claim 7, wherein classifying the detected changes in the biographic information and the biometric information according to a level of importance comprises assigning a ranking to the detected changes.

11. The method of claim 7, wherein assigning ranking to the detected changes comprises assigning a ranking of low risk, moderate risk or high risk.

12. The method of claim 7, further comprising:
    initiating an investigation of the entity if the classified level of importance exceeds a threshold.

13. The method of claim 12, further comprising updating the encounter information if the detected changes reflect a change in the biographic information or biometric information without changing the entity's identity.

14. A computer-readable recording medium containing computer-readable codes providing commands for a computer to execute a process including:
    gathering biographic information and biometric information relating to an entity's identity during a first encounter;
    recording encounter information regarding the first encounter;
    comparing the biographic information and the biometric information from the first encounter with biographic information and biometric information from a second encounter;
    detecting changes in the biographic information and the biometric information between the compared first and second encounter;
    determining risks associated with the entity according to the detected changes in the biographic information and the biometric information between the first and second encounter; and
    classifying the determined risk according to a level of importance;
    storing the determined risk level and the detected changes in the biographic information and the biometric information from the first and second encounter.

* * * * *